United States Patent [19]

Dumoulin

[11] Patent Number: 4,838,741

[45] Date of Patent: Jun. 13, 1989

[54] METHOD FOR MAKING AN EPICYCLIC SPEED REDUCER WITH TWO STAGE INTEGRAL ROTOR

[75] Inventor: Jacques Dumoulin, Boulder, Colo.

[73] Assignee: Primaxis Corporation, Boulder, Colo.

[21] Appl. No.: 044,484

[22] Filed: May 1, 1987

[51] Int. Cl.⁴ .......................... B23C 9/00; B24B 1/00
[52] U.S. Cl. ..................... 409/131; 409/132; 409/142; 409/38; 409/51; 51/281 R; 51/326; 51/290
[58] Field of Search ............... 409/132, 131, 142, 38, 409/50, 51, 52; 51/281 R, 290, 291, 326; 74/804, 805, 830, 835, 836, 665 K, 665 L, 390, 570, 572

[56] References Cited

U.S. PATENT DOCUMENTS

| | | | |
|---|---|---|---|
| 1,706,791 | 3/1929 | Leighton | 409/131 |
| 2,870,578 | 1/1959 | Baier | 409/142 X |
| 3,602,093 | 8/1971 | Fischer et al. | 409/132 X |
| 3,808,944 | 5/1974 | Braginetz | 409/142 |
| 3,867,868 | 2/1975 | Natkai et al. | 409/142 X |
| 3,886,689 | 6/1975 | Yoshino | 409/142 X |
| 3,902,278 | 9/1975 | Uhtenwoldt et al. | 409/142 |
| 3,939,737 | 2/1976 | Horvath | 74/805 |
| 3,964,367 | 6/1976 | Stöferle et al. | 409/142 X |
| 4,524,644 | 6/1985 | Pierrat | 74/804 |
| 4,552,037 | 11/1985 | Distin, Jr. et al. | 74/805 |
| 4,553,451 | 11/1985 | Distin, Jr. et al. | 74/805 |
| 4,554,846 | 11/1985 | Distin, Jr. et al. | 74/805 |
| 4,604,916 | 8/1986 | Distin, Jr. | 74/805 |
| 4,640,154 | 2/1987 | Osborn | 74/805 |
| 4,658,675 | 4/1987 | Murray | 74/805 |
| 4,736,654 | 4/1988 | Ren | 74/804 |

FOREIGN PATENT DOCUMENTS

| | | | |
|---|---|---|---|
| 0020314 | 12/1980 | European Pat. Off. | 74/805 |
| 58-118354 | 7/1983 | Japan | 74/805 |

Primary Examiner—William L. Sikes
Assistant Examiner—Brian M. Healy

[57] ABSTRACT

In the present invention, a two-stage integral epitrochoidal cyclic rotor is produced by a machining method which produces the desired tolerences in both stages of the rotor without removing the work-piece from the support that holds it throughout the manufacturing process. In the manufacturing process, the blank starting work-piece, which is preferably a circular disc, is secured to a support element, for example by a magnetic chuck. The overall outer surface of the work-piece is then rotated and orbited while it is accurately machined to produce the epitrochoidal contour of the first stage of the rotor. Then, without releasing the work-piece from the holding surface, a second accurate machining operation, again with rotation and orbiting, is carried out on the upper half of the work-piece to form the epitrochoidal contour of the second stage of the rotor. This arrangement provides an inexpensive method for making a two-stage integral epitrochoidal cyclic rotor in which the required precision of each contour is obtained while the tolerances between the epitrochoidal surfaces of the two stages are achieved and maintained. An epicyclic drive using the two-stage integral epitrochoidal cyclic rotor is also disclosed.

3 Claims, 3 Drawing Sheets

METHOD FOR MAKING AN EPICYCLIC SPEED REDUCER WITH TWO STAGE INTEGRAL ROTOR

BACKGROUND OF THE INVENTION

1. Field of the Invention

This invention relates to a high-precision multiple stage speed reducer that incorporates a two-stage integral epicyclic orbiting rotor having significantly different diameters for each stage.

2. Description of the Related Art

Epicyclic power transmission systems have been known for many years. Important improvements have been made in manufacturing techniques and in the design of the epicyclic units, yet such transmission systems have never reached the breadth of application that was anticipated. One reason for this shortfall is relatively high backlash caused by the build-up of tolerances within the unit. In an effort to minimize the backlash increasingly expensive manufacturing procedures have been used, greatly increasing the costs of the units. Excessive friction also occurs in units that are not manufactured with the greatest precision.

Epicyclic speed reducers using pinion gears orbitally rotating within ring gears have been used for limited applications. For example, such units have been used in hand-driven mechanisms for raising and lowering automobile windows and seats. Such a unit is described in U.S. Patent issued in 1962 to Loutron et al in which a pair of pinion gears of different diameter rotate orbitally within a pair of internal ring gears. Such gear units are not efficient in terms of the amount of torque that can be transmitted. The gears are expensive to make because each tooth of each toothed member must be precisely cut. Such devices can transmit only a limited torque because the only a few of the teeth are engaged at any particular time, and these few teeth must carry the entire transmitted torque. This is a defect that is inherent in the gear type speed reducer. Because of these limitations, such drives were not generally suitable for continuous operation particularly under high speed or heavy load conditions. Later, the teeth of the internal ring gear were replaced by a series of rollers or by a hypotrochoid surface. The pinion gear was replaced by an orbiting rotor having an epitrochoidal outer surface. Developments such as these are illustrated by U.S. Pat. Nos. 4,050,331 to Baren; 4,271,726 to Ryffel; and 4,487,091 to Pierrat.

A major step forward is represented by the disclosure in U.S. Pat. No. 4,584,904 to Distin which discloses a drive system in which a pair of conjugate epitrochoidal and hypotrochoidal surfaces are disposed respectively on driving and driven members, with a number of cylindrical rollers interposed between them. These rollers transmit the torque while remaining at all times engaged with the opposed trochoidal surfaces. When manufactured with sufficient precision, the Distin drive accomplishes intended purpose. However, the cost of manufacturing and assembling the drive with the necessary precision has so far precluded its wide industrial application.

SUMMARY OF THE INVENTION

The present invention is an improvement on the speed reducer described in the Distin patent mentioned above. A structure and method of fabrication is provided that materially reduces the cost and number of parts in the drive and results in a self-contained, ultra-precise, low-backlash speed-reduction mechanism with a high torque capacity relative to its size. The device is easily manufactured and is capable of being coupled directly to electric motors without special coupling devices In the Distin and similar units, it is desirable to use a two stage mechanism in which the first stage produces a lower speed reverse rotation of an eccentrically mounted orbiting rotor with an outer trochoidal surface. This rotor is secured, by bolts, welding or other means, to a second orbiting member that causes rotation of a trochoidal race at a still lower speed and in the same direction as the original driving force. The problem arises in actual construction of the unit because of the tolerance build-ups. The two rotor segments must be machined with great accuracy and then must be secured and locked together with equal accuracy. This procedure is expensive, slow and usually fails to meet the desired operating characteristics.

In the present invention, an integral rotor is utilized which is machined to the desired tolerances without removing the rotor from the chuck that holds the rotor during manufacture. In order to permit machining of the two trochoidal surfaces, the minimum radius of one of the rotor segments is greater than the maximum radius of the other. In manufacture, the circular part that is to become the rotor is secured to a flat surface, for example by a magnetic chuck. The outer surface is then machined to correspond to the trochoidal contour of the larger segment of the rotor. Without releasing the rotor from the chuck, the machining operation is carried out on the upper half of the rotor to form the epitrochoidal contour of the smaller rotor segment. This arrangement provides an inexpensive method for making the rotor while the required precision of each contour and the precise relationships between the two epitrochoidal surfaces are achieved and maintained.

DESCRIPTION OF THE PREFERRED EMBODIMENT

Figure 1:
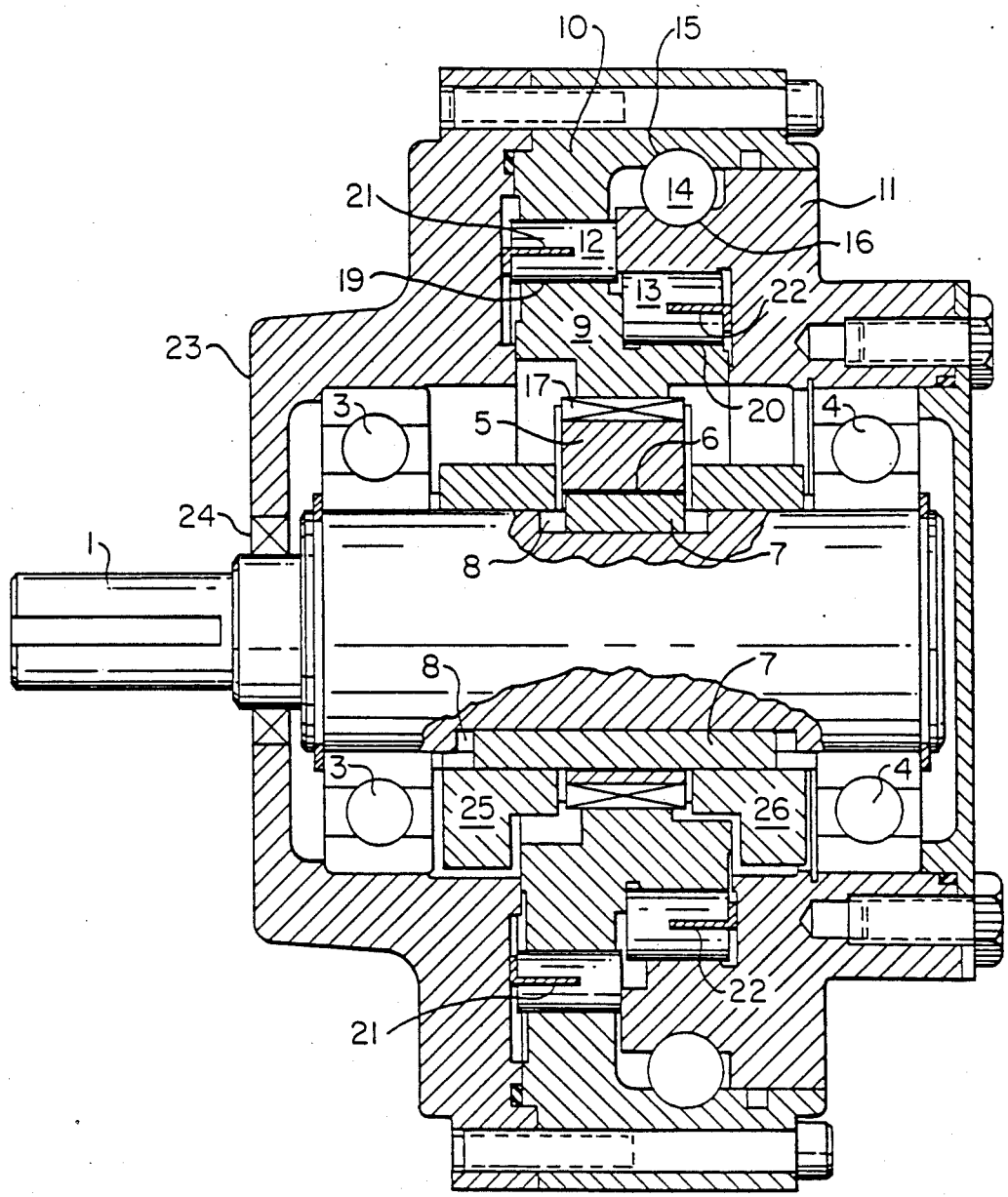
FIG. 1 is a section along line A—A of FIG. 2 through a speed reducer incorporating the invention.
Figure 2:
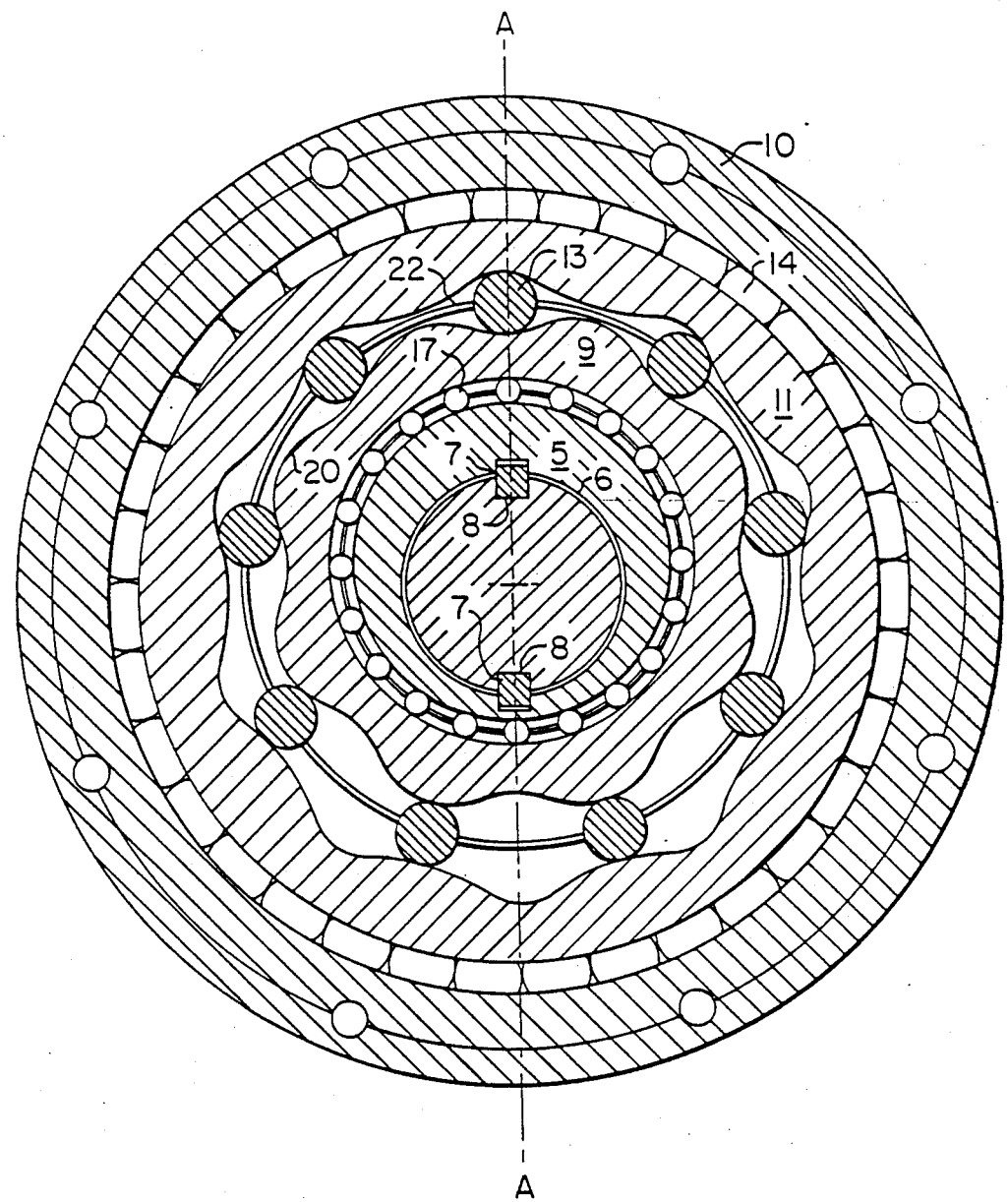
FIG. 2 is a sectional view along line B—B of FIG. 1.

As shown in FIGS. 1 and 2, a drive shaft 1 is provided to be driven from any desired source (not shown). The shaft 1 is rotatably supported by two spaced bearings 3 and 4 (FIG. 1) and extends through an eccentric bushing 5. There is a significant amount of clearance between the shaft 1 and the inner surface of the bushing 5 as illustrated at 6. Two diametrically opposed keys 7 and 8 (FIG. 2) extend into slots in the shaft 1 and in the inner surface of the bushing 5. These keys provide a torsionally rigid coupling between the shaft 1 and the bushing 5, but allow radial movement between the shaft 1 and the bushing 5 in the direction of the line A—A in FIG. 2 which passes through the point of greatest eccentricity of the bushing 5. A two-stage rotor 9 is mounted on a bearing 17 surrounding the bushing 5. The eccentrically mounted bushing causes the rotor 9 to follow an orbital path within a reaction hypo ring 10 and an output hypo ring 11 each of which has a hypotrochoidal inner surface.

A first set of rollers 12 is interposed between the larger outer epitrochoidal surface of the first stage of the rotor 9 and the corresponding inner hypotrochoidal surface of the hypo ring 10. A second set of spaced rollers 13, of a number different from the rollers 12, is interposed between the smaller outer epitrochoidal surface of the second stage of the rotor 9 and the corresponding inner hypotrochoidal surface of the hypo ring 11. The spacing of the rollers 12 and 13 is maintained by a pair of retainers 21 and 22. The arrangement of these rollers 12 and 13 are described in more detail in the Distin patent referenced above.

A set of rolling elements 14 are mounted between the hypo ring 11 and the hypo ring 10, allowing the hypo ring 11 to rotate freely within the hypo ring 10. The elements 14 can be either balls or rollers. The bearing races 15 and 16 for the elements 14 are integral with the hypo rings 10 and 11, respectively. An end plate 23 houses the bearing 3 and a shaft seal 24 around the drive shaft 1. Two counterweights 25 and 26 provide dynamic balancing. In operation, the shaft 1 causes the rotation of the eccentric bushing 5 which in turn forces the rotor 9, which is free to rotate on the bushing 5, to orbit within the hypo rings 10 and 11. Since the rotor 9 is an integral structure, the hypo rings 10 and 11 are forced to rotate relative to each other as described in the Distin patent referenced above.

The epitrochoidal surface of the first stage of the rotor 9 has 12 lobes which react, through the rollers 13, with the hypotrochoidal surface of the reaction hypo ring 10 which has 14 lobes. The reaction hypo ring 10 is maintained in a stationary position and is not free to rotate causing the rotor 9 to rotate on the bushing 5 in a direction opposite from rotation of the shaft 1 and at a lower angular speed. Because the two stages of the rotor are integral, the second epitrochoidal surface, which has, for example, 12 lobes or at least a different number of lobes than the hypo ring 11, rotates on the bushing 5 and reacts, through the rollers 13, with the output hypo ring 11 which has two more lobes than the second epitrochoidal surface This action causes the output hypo ring 11 to rotate at a still lower speed and in the same direction as the input shaft 1. The ring 11 has a precision flat surface 20 that provides the output connection. If a resisting torque is applied to one hypo ring and the other hypo ring is held stationary, the rotation of shaft 1 will create a substantial radial force which will be exerted between the hypo rings. This force will pass through the rolling elements 14 creating minimum deflection and power loss. If the input shaft 1 is not exactly concentric with the axis of rotation of the hypo rings 10 and 11, or if the amount of eccentricity of the bushing 5 is not exactly matched by the total excursion of the epitrochoidal contours of the rotor 9 and the hypotrochoidal contours of the hypo rings 10 and 11, the error will be absorbed by a sliding motion occurring between the input shaft 1 and the eccentric bushing 5 in the direction of the line A—A of FIG. 2. The excursion of the sliding motion will be equal to the potential error in concentricity or in the eccentricity of the bushing 5.

Figure 3:
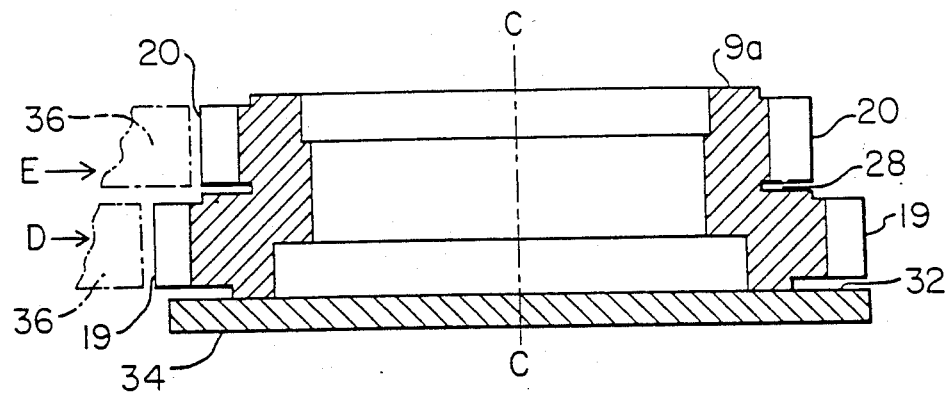
FIG. 3 is a diagrammatic view illustrating the method of making the epichotroid contours of the two-stage rotor.

To machine the rotor 9, a circular steel blank 9a (FIG. 3) is secured to a metal surface 22 of a table 24 that is mounted for rotation about a center line C—C. The preferred securing means is a magnetic chuck (not shown) which locks the steel blank in place without any structures that would interfere with the contouring functions. The blank 9a is secured with its transverse central axis as near the line C—C as possible. Once the machining operation is started, the blank 9a is not moved with respect to the surface 22 until all contouring and machining operations have been completed.

While the table 24 is rotating and orbiting at a constant speed, a precision machining tool 26, which may be either a milling cutter or grinding wheel, engages the outer edge surface of the rotor blank 9a in the position indicated by the arrow "D". The machining tool 26 follows a pattern that in conjunction with the rotation and orbital motion of the table 24 traces the desired epitrochoidal path of the larger first stage contour of the rotor 9. The rotation and orbital movement of the table 24 can be controlled by a mechanical tracing mechanism or by a computer programmed to provide the precise movement of the table 24 relative to the machining tool 26.

When the contour for the first stage of the rotor 9 is completed, a radial slot 28 is milled around the outer perimeter of the blank 9a at the interface between the first and second races of the rotor. The machining tool 26 is then raised to the position indicated by the arrow "E" where it machines the second and smaller epitrochoidal surface of the rotor 9. After completion of the two epitrochoidal surfaces, the central opening through the rotor 9 is formed by conventional boring operations without moving the blank 9a from the table 24. The table 24 then rotates without orbital motion.

The difference in the two diameters of the epitrochoidal segments of the rotor 9 permits the contoured races 19 and 20 to be milled and ground in one set up to insure near perfect concentricity between the two races. The marked increase in precision is achieved with a substantial reduction in machining time over that required by other methods. The difficult task of matching and securing two separate segments to form the rotor 9 has been eliminated.

The same machining tool 26 may be used throughout the operation, but increased precision and production can be obtained economically by the use of more than one grinding wheel during the machining operation. The term machining tool as used here means either one or a number of machining tools.

I claim:

1. In an epicyclic power transmission drive, the method of making a two-stage integral epicyclic rotor including the steps of providing a metal blank, securing said blank in a fixed position to a supporting surface, rotating said blank and said supporting surface in a plane parallel with said surface, moving a machining tool into engagement with the edge of said blank, adjusting the radial position of said machining tool in predetermined relationship with the orbital and rotary motion of said surface to form on the outer perimeter of said blank a first epitrochoidal contour, moving a machining tool into engagement with the edge portion of said blank at a point removed a predetermined distance from said surface, adjusting the radial position of said machining tool in predetermined relationship with the rotary and orbital motion of said surface to form on the outer perimeter of said blank at a point removed by said predetermined distance from said surface a second epitrochoidal contour having a maximum diameter less than the minimum diameter of said first epitrochoidal contour, and machining a central opening in said blank for mounting in said drive, all of said operations being accomplished while said blank remains in fixed position on said surface.

2. The method as claimed in claim 1 wherein said blank is secured to said surface by a magnetic chuck.

3. The method as claimed in claim 1 wherein said first epitrochoidal contour of said rotor has a different number of lobes than the said second epitrochoidal contour.

* * * * *